Sept. 1, 1942.  W. SAMANS  2,294,806
FLANGE FOR PRESSURE VESSELS
Filed Sept. 13, 1939
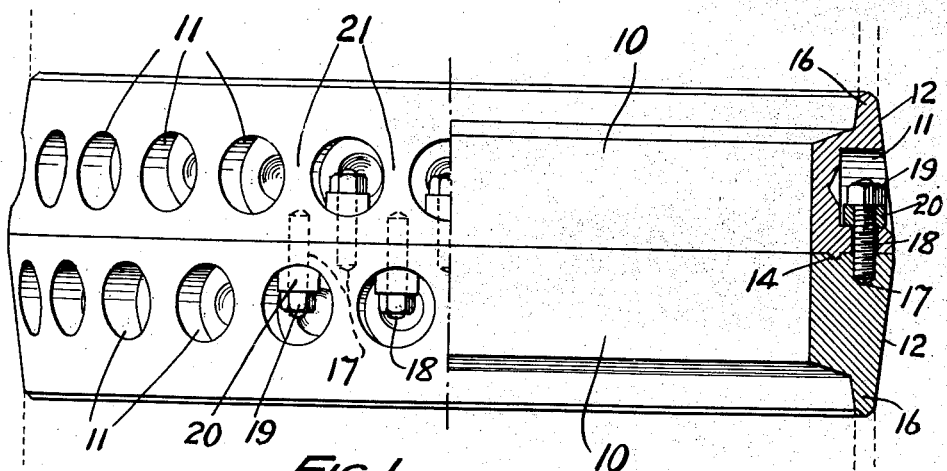
FIG.1.
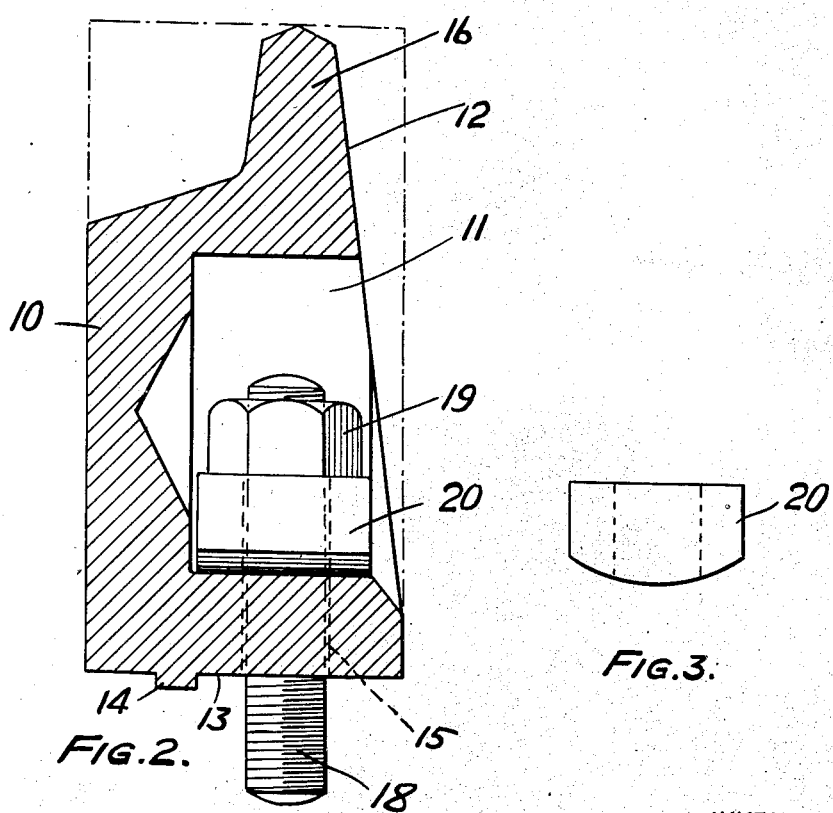
FIG.2.
FIG.3.
WITNESS:
INVENTOR
Walter Samans
BY
ATTORNEYS.

Patented Sept. 1, 1942

2,294,806

UNITED STATES PATENT OFFICE 2,294,806

FLANGE FOR PRESSURE VESSELS

Walter Samans, Philadelphia, Pa., assignor to Sun Oil Company, Philadelphia, Pa., a corporation of New Jersey Application September 13, 1939, Serial No. 294,710

10 Claims. (Cl. 285—137)

The present invention relates to bolted flanges for use on pressure vessels and is particularly adapted for use on large diameter openings in such vessels. Large openings which are to be used for access of pressure vessels during periods set aside for inspection and repairs may be closed by the design now submitted without the excessive and incalculable secondary stresses and strains that occur at such openings by the use of the conventional L-shaped flange, and which strains have resulted in leaks that may be dangerous if the contents of the vessel are inflammable or noxious.

It is an object of the present invention to provide a flange of such design that less metal is required for its manufacture than is required in conventional flanges designed from the same type of service.

A further object of the invention is to provide a flange which may be readily fabricated.

Another object of the invention is to provide a flange of such design that the stresses imposed thereon are so distributed that a flange made in accordance with the present invention will be stronger than a flange of similar weight made in accordance with conventional practice.

Still another object of the invention is to provide a flange so designed that a more secure joint may be obtained when such flange is bolted to a companion flange or other structure than is possible with a conventional flange, while at the same time decreasing the bolt stresses and thereby decreasing the size and/or number of bolts required to secure the flange to a companion flange or other structure.

Other and further objects will be apparent as the description progresses.

For a better understanding of the invention, reference should be made to the accompanying drawing in which:

Fig. 1 is an elevation, partly in section, showing two companion flanges designed in accordance with the present invention.

Fig. 2 is a cross section of a flange designed in accordance with the present invention, and Fig. 3 is a detail of a type of washer which may be used in bolting the flanges of the present invention.

For the sake of simplifying the description, the flange will be described in connection with a preferred method of its manufacture, reference being had to the drawing. The flange may be constructed most readily from a rectangular billet, indicated by broken lines in Fig. 2, which is rolled or pressed into the required annular shape and then welded into an annulus. The annulus thus formed forms the body 10 of the flange. A plurality of holes or recesses 11 are drilled or otherwise cut in the periphery or outer wall 12 of the flange. The face 13 of the flange may be cut away to provide a packing tongue 14, or correspondingly a packing groove depending on whether the flange is to be a male or a female flange respectively. A bolt hole 15 is drilled from the face of the flange into each of the recesses 11, the spacing of the recesses 11 and correspondingly the bolt holes 15 having twice the desired pitch of the bolts as this pitch may be determined for the size and strength of the bolts considered, compared to the operating pressure and temperature in the vessel. The ring which forms the flange may be machined to substantially the cross sectional shape shown in Fig. 2 during its fabrication, but preferably after the recesses 11 have been formed therein. In designing the shape of the cross-section of this flange, it is important, in accordance with the present invention, that the center line of the hub 16 be on or outside of the center line of the bolt holes 15 so that the center line of the hub 16 of the flange and the radii of the bolt circle form two concentric circles with that of the hub having the same or greater radius than the bolt circle. Holes 17 are tapped into the face of the flange intermediate to the bolt holes 15, the spacing of the tapped holes 17 having twice the desired pitch of the bolts, in order to receive the stud bolts 18 by means of which two companion flanges may be bolted together. In bolting together two companion flanges, stud bolts 18 are first inserted into each of the tap holes 17 in the face of the flange and a suitable gasket or packing is placed in the packing groove of the female flange. The flanges are then brought together so that the stud bolts 18 in one flange register with and pass through the bolt holes 15 of the opposite flange, the ends of the bolts 18 extending into the recesses 11 about the periphery of the flange. A washer 20, shown in detail in Fig. 3, having a cylindrical face adapted to fit the walls of the recesses 11 is placed over the end of each of the stud bolts and the flanges are then drawn together by placing and tightening the nuts 19 on each of the stud bolts.

While a preferred method of fabricating the flange embodied in the present invention has been described in connection with the description of the flange, it is understood that other methods of fabrication may be employed, it of course being possible to use a forged ring instead of rolled or welded ring or even to cast a flange in accordance with the present design. It is to be noted that substantial ribs of metal 21 are left in the body of the flange between each pair of recesses 11 thereby substantially strengthening the flange and permitting the center line of the neck 16 to be placed outside of the radii of bolt holes 15.

It has been found that a bolting flange designed in accordance with the present invention requires about 25% to 50% less metal in the ring from which it is fabricated than a flange of the conventional L-shaped cross section, both flanges being designed for similar service. This saving in metal is made possible since the stresses imposed upon the flange are better distributed in the flange of the present invention. For instance, in all flanges of conventional L-shape, the gasket pressure is imposed by the bolt force when the flanges are first bolted together, and the application of the force by the bolts is counteracted mainly by the dishing resistance of the flange. If the diameter of the flange is increased, its effectiveness to resist dishing stresses is greatly reduced unless its thickness is greatly increased. The bolt force is also resisted by initial hoop stresses exerted in the hub and unless the height of the hub is made very large, high "median," bending and hoop stresses will be developed at the edge of the hub where it is attached to the shell of the vessel. The bolt stresses in a conventional L-shaped flange are extremely high since the gasket is in a circle inside the bolt circle and the force transmitted to the hub of the flange from the shell of the vessel, or nozzle neck in the case of an access opening, is also applied on a circle inside the bolt circle and therefore tends to reduce the gasket pressure and correspondingly necessitates the use of a higher initial bolt force in order to prevent the reduction of gasket pressure beyond safe limits and correspondingly necessitates a heavier flange in order to resist the dishing and other stresses imposed on it. The bolt stresses used with the L-shaped type of flange when designing for the size and number of bolts required and the greater bolt stresses used for the design of the flange itself are assumed to be centered on the bolt centers, and are not by any means the true bolt stresses that come into play. When bolting two flanges together, the flanges are dished (deflected) and the bearing of the nuts on the back of the flanges becomes centered inside of the bolt circle, thus transmitting to the bolt an eccentric loading that may result in a true maximum stress of from 25% to 50% over the value used in the calculations. In accordance with the present design, the force from the shell or nozzle neck transmitted to the hub of the flange is applied on a concentric circle outside the bolt circle and therefore tends to balance or actually increase the gasket pressure so that a substantial decrease in the initial bolt pressure is permissible, thus permitting a decrease in the size and/or number of bolts. In addition, it is possible in accordance with the present invention, by the more effective use of bolts, in centering the load on them, to reduce the width of gasket required as well as to raise the bolt stress used in the calculations, and thus to reduce their cross-section. The size of the bolts and the weight of the total number of bolts required in a flange may be approximately 20% less and still have an actual effective strength greater than exists in the bolts used in a flange of the conventional L-shape, and providing the same diameter of opening. Likewise, since the dishing stress on the flange is not increased by the force transmitted to the hub of the flange from the shell or nozzle neck of the vessel, less metal is required in the flange to resist the stresses imposed thereon.

What I claim and desire to protect by Letters Patent is:

1. A bolted flange of the character described having bolt holes and a hub the center line of which falls in a circle concentric with and not of smaller radius than the center line of the bolt holes.

2. A flange of the character described comprising an annular body having a multiplicity of spaced apart recesses extending inward from the periphery of said body and bolt holes extending from the face of said flange into each of said recesses, and a hub portion of reduced cross section, the center line of said hub section being concentric with and not inside the center line of said bolt holes.

3. A flange of the character described comprising an annular body having a multiplicity of spaced apart recesses extending inward from the periphery of said body, bolt holes extending from the face of said flange into each of said recesses and tapped holes in the face of said flange intermediate to said bolt holes and adapted to receive and hold stud bolts.

4. A bolted annular flange having adjacent its outer face a hub of smaller cross section than the flange, there being a multiplicity of spaced apart recesses extending inward from the outer face of the flange and bolt holes extending from said recesses to that face of the flange adapted for engagement with the member to which it is bolted, the circumferential center line of the hub being concentric with, and at least of as great radius as, a circumferential line intersecting the axes of the bolt holes.

5. A bolted flange of the character described comprising an annular body having a multiplicity of spaced apart recesses extending inward from the periphery of said body and having bolt holes extending into said recesses from the face of the body that is adapted to engage the member to which it is to be secured, and an annular hub portion of reduced cross-section projecting from said body opposite said engaging face and adjacent the periphery of said body and of such thickness that its center line falls in a circle concentric with but not of smaller radius than the center lines of the bolt holes.

6. A bolted flange of the character described comprising an annular body having a multiplicity of spaced apart recesses extending inward from the periphery of said body and having bolt holes extending into said recesses from the face of the body that is adapted to engage the member to which it is to be secured, and an annular hub portion of reduced cross-section projecting from said body opposite said engaging face and adjacent the periphery of said body and of such thickness that its center line falls in a circle concentric with but not of smaller radius than the center lines of the bolt holes, said annular body also having tapped holes in said engaging face alternating with and intermediate to said bolt holes and adapted to receive and hold said bolts.

7. A bolted flange of the character described comprising an annular body having a multiplicity of spaced apart recesses extending inward from the periphery of said body and having bolt holes extending into said recesses from the face of the body that is adapted to engage the member to which it is to be secured, and an annular hub portion of reduced cross-section projecting from said body opposite said engaging face and adjacent the periphery of said body and of such thickness that its center line falls in a circle concentric with and of at least as great radius as a circle intersecting the center lines of the bolt holes, said recesses being spaced apart to thereby leave in the body of the flange between said recesses ribs of metal flush with the peripheral face of said hub portion to thereby allow the center line of the hub to be located as defined.

8. A bolted flange of the character described comprising an annular body having a series of recesses extending inward from the peripheral face of the flange, said recesses being spaced apart to leave between them substantial ribs of metal substantially flush with and comprising part of the peripheral face of the flange, said body having bolt holes extending into said recesses from the face of the body that is adapted to engage the member to which it is to be secured, and an annular hub portion of reduced cross-section projecting from said body opposite said engaging face and of such thickness that its center line falls in a circle concentric with but not of smaller radius than the center lines of the bolt holes.

9. A bolted flange in accordance with claim 8 in which the outer face of the hub is flush with the peripheral face of the flange.

10. A pair of flanges adapted to be bolted together, each constructed as defined in claim 8 and provided also with tapped holes extending from the face of the flange that is adapted to engage the face of the other flange and arranged alternately with the bolt holes, whereby the two flanges may be abutted together with the bolt holes of one flange aligning with the tapped holes of the other flange.

WALTER SAMANS.